Figure 1:
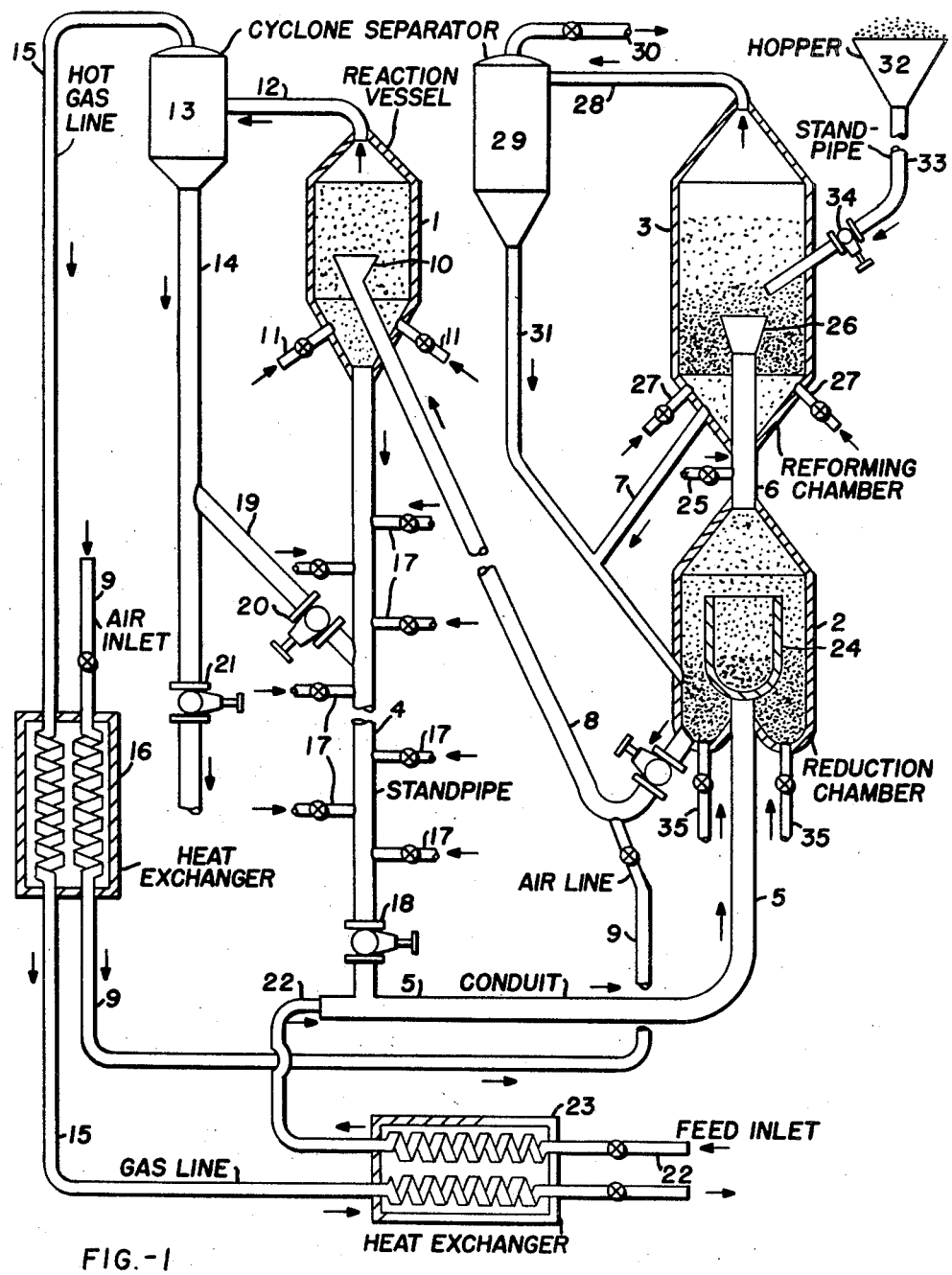

Warren K. Lewis
Edwin R. Gilliland   Inventors

By J. Cashman Attorney

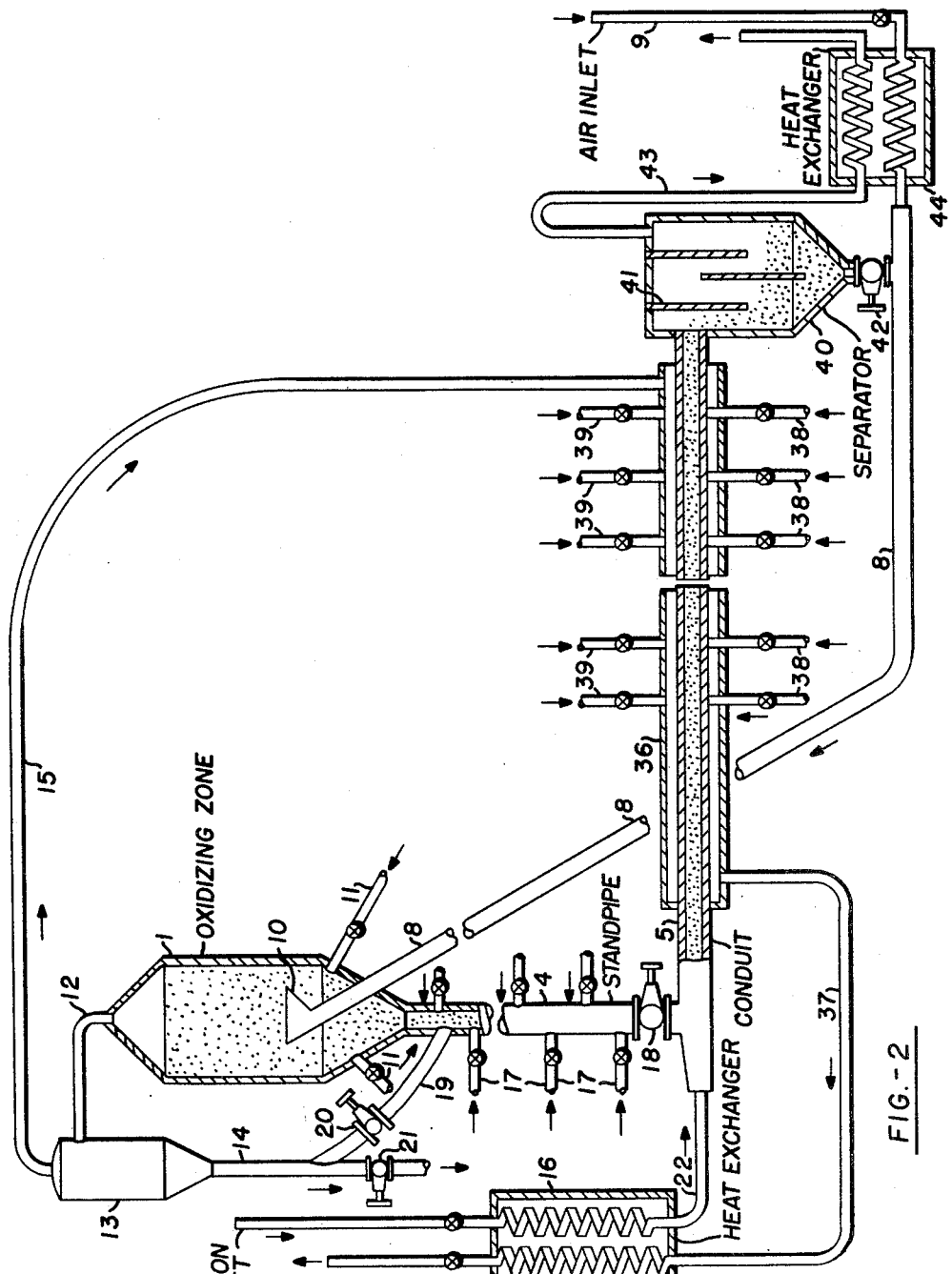

Patented Mar. 9, 1954

2,671,719

UNITED STATES PATENT OFFICE 2,671,719

PRODUCTION OF INDUSTRIAL GAS MIXTURE OF HYDROGEN AND CARBON MONOXIDE

Warren K. Lewis, Newton, and Edwin R. Gilliland, Arlington, Mass., assignors to Standard Oil Development Company, a corporation of Delaware Application August 3, 1946, Serial No. 688,351

9 Claims. (Cl. 48—196)

The present invention is directed to a method for producing industrial mixtures of carbon monoxide and hydrogen.

In many industrial processes, the raw material is composed of a mixture of carbon monoxide and hydrogen. Chief among these processes are the so-called methanol synthesis, in which carbon monoxide and hydrogen are reacted in the presence of a suitable catalyst to produce oxygenated organic compounds, and the Fischer-Tropsch synthesis, in which carbon monoxide and hydrogen, in suitable proportions, are reacted in the presence of a suitable catalyst and under selected conditions to produce a product primarily composed of liquid hydrocarbons. In processes of this type, it is highly desirable that the feed gas be free from contamination with inert gaseous substances.

The obvious way to obtain a mixture of carbon monoxide and hydrogen is to subject a mixture of a hydrocarbon, such as methane, and air to controlled combustion. This procedure, however, results in a gas containing a large quantity of nitrogen. This detrimental dilution has led to much study and experimentation, directed toward the development of a method for producing the desired "make gas" free from contaminants and diluents.

One procedure which has been suggested is to use a metal as an oxygen carrier, said metal being first reacted with air to produce an oxide, which then is reacted with the hydrocarbon to produce a mixture of carbon monoxide and hydrogen. Most of the metals useful for this purpose which do not introduce physical difficulties, of which iron is a typical example, are subject to the defect that reaction of their oxides with a hydrocarbon does not produce the desired mixture of carbon monoxide and hydrogen, but produces a conglomeration of gases of which carbon monoxide and hydrogen constitute only a minor part. For example, using iron as an illustration, there are several reactions involved when the oxide is reacted with a hydrocarbon, such as methane. The oxide can react with methane to produce carbon monoxide and hydrogen. These can also react to produce carbon dioxide and hydrogen. Both of these reactions are fairly slow. The hydrogen produced, on the other hand, reacts rapidly with the iron oxide to produce iron and water. Likewise, the carbon monoxide can react with iron oxide to produce iron and carbon dioxide. Again, the hydrogen produced reacts fairly rapidly with the carbon dioxide to produce water and carbon monoxide. The reduced iron at the temperature of operation is a very active cracking catalyst for the hydrocarbon, converting it to carbon and hydrogen. The carbon produced reacts fairly rapidly with water to produce carbon monoxide or carbon dioxide and hydrogen. The overall tendency, therefore, is to produce a gas containing substantial amounts of carbon dioxide and water as well as some unreacted hydrocarbon.

It has already been proposed to improve the process just described by mixing the gas resulting from the reaction of the hydrocarbon with the metal oxide with additional hydrocarbon, providing the residual hydrocarbon in the mixture is inadequate, and to contact the resulting mixture with a reforming catalyst at a temperature suitable for the reaction of the hydrocarbon with steam and carbon dioxide. This reaction is endothermic and requires a considerable heat supply. Since the oxidation stage of the overall process is highly exothermic, it is desirable to provide a method of this character in which the exothermic heat of reaction may be utilized to supply heat for the endothermic reforming step.

The present invention contemplates a process in which the exothermic heat of reaction in the oxidation stage is carried directly into the reduction and reforming stages by a heat carrier traveling through such stages, which heat carrier may comprise the metal used in the process in its free state at its various stages of oxidation. Also contemplated is the provision in such a process of a relatively long period of contact between the hydrocarbon and the metal oxide before this mixture enters the reforming stage. This is particularly important where the reforming catalyst is an active cracking catalyst as in the case of iron, nickel, cobalt and copper because it minimizes the production of carbon in the process. Because the contact material passes through all the stages, any deposition of carbon on the material represents a loss of carbon in the process because it will be burned off in the oxidation stage.

The nature of the present invention may be more clearly understood from the following detailed description of the accompanying drawing, in which:

Fig. I is a front elevation in diagrammatic form of one type of plant suitable for the practice of the present invention; and Fig. II is a similar view of a simplified form of apparatus for the practice of one embodiment of the present invention.

Referring to the drawing in detail, numeral 1 designates a reaction vessel which may be termed the oxidation chamber, numeral 2 represents a second vessel which may be termed a reduction chamber, and numeral 3 designates a third chamber which may be termed a reforming chamber. Solid material in finely divided form travels from chamber 1 through standpipe 4 in conduit 5 to chamber 2, thence through pipe 6 to chamber 3, back through bottom drawoff 7 from chamber 3 to chamber 2 and from there through bottom drawoff 8 back to chamber 1. Standpipe 4 and bottom drawoff 8 are broken to indicate a considerable difference in elevation between chamber 1 and chambers 2 and 3, respectively. This difference in elevation remains sufficiently great so that the finely divided solid in fluidized condition in standpipe 4 will constitute a column of sufficient height to create a hydrostatic pressure adequate for the maintenance of the desired pressure in chambers 2 and 3, it being desired to operate chamber 1 substantially at atmospheric pressure.

The finely divided solid material in chamber 1, at any given instant, is predominantly a metal oxide which, in the case of a metal having a plurality of oxides, may be a mixture of these oxides. In the ordinary case, some free metal will also be present in this chamber. The solid leaving this chamber, however, is predominantly metal oxide, it being understood, of course, that the presence of inert solids, such as sand and other substances stable under the operating conditions and having a high heat capacity, is also contemplated. In chamber 2 the finely divided solid, in addition to any inert heat carrier, will be mainly metal with some residual metal oxide. In chamber 3 the finely divided solid, apart from any inert heat carrier, will normally be free metal.

In carrying out the process of the present invention, finely divided solid in the system is maintained in a fluidized state. For this purpose, the solid is employed in the form of fine particles, substantially none of which is larger than 10 mesh and the major portion of which is smaller than 100 mesh, this latter portion including particles as small as 20 microns in diameter or less. Good fluidization is promoted by providing particles of sizes covering a wide range. For example, if about 30% of the particles are smaller than 80 microns in diameter, larger particles up to 10 mesh may be tolerated. If difficulty is encountered in the fluidization of free metal, this may be mitigated by employing a light, finely divided powder, such as magnesia or clay in conjunction with the metal, either as a mechanical mixture therewith or in the form of a support upon which the metal is deposited.

When it is desired to maintain the finely divided solid in a fluidized state in such a manner as to establish a suspension of the solid having a high density, say, of at least 20 lbs./cu. ft., the velocity of the fluidizing gas must be adjusted with reference to the particle size and particle size distribution of the finely divided solid. For most materials, a suitable gas velocity for this purpose is within the range of .5 to about 7 ft./second. With heavier materials, the velocity is in the upper end of this range. Generally, a velocity within the range of 1 ft. to 5 ft./sec. is satisfactory with materials of the type referred to herein. This is with particular reference to the velocity of the gas in chambers 1 and 3. In chamber 2 a higher velocity will normally obtain because it is desired to take the bulk of the solid material passing through chamber 2 up into chamber 3. By suitably proportioning chambers 2 and 3, the velocity in the latter may be maintained within the range specified while the velocity in the former may be as high as 20 ft./sec. or higher.

As previously indicated, a mass of solid particles comprising a metal of reduced oxygen content, ordinarily free metal, is conveyed from chambers 2 and 3 to chamber 1 through line 8. Air is introduced into line 8 through line 9 to facilitate the travel of solid material therein into chamber 1 in which it is discharged out of a funnel-like member 10. With a suitably adjusted air velocity in line 8, the solid spouting out of the funnel 10 forms a dense suspension above the funnel having a definite upper level. The maintenance of this suspension is aided by the introduction of additional gas into the bottom of chamber 1 through inlets 11. This gas will usually be air but it may contain adjusted amounts of a cheap combustible material, such as torch oil or finely divided coke, or the like. The purpose of this is to develop as much heat as possible in chamber 1 compatible with the maintenance of the desired temperatures in the other chambers. Ordinarily, the temperature in chamber 1 will be maintained between about 1700° and 2300° F., preferably in the upper end of this range.

The combustion gases leave the upper end of chamber 1 through line 12 and pass through a cyclone separator 13 from the bottom of which solid is drawn off through pipe 14 and from the top of which hot gas is led away through line 15 which passes through a heat exchanger 16 in which it gives up heat to the incoming air in line 9.

Finely divided metal oxide, either as such or mixed with an inert heat carrier of the type heretofore mentioned or deposited on a carrier such as alundum or magnesia, depending upon what solid is employed in the process, continuously falls out of the dense phase above the funnel 10 into bottom drawoff or standpipe 4. This pipe is provided with suitably spaced jets or nozzles 17 for bleeding into the standpipe suitable quantities of gas to maintain the solid therein in a fluidized condition. The lower end of the standpipe is provided with a conventional slide valve or star wheel or other device 18 for controlling the flow of solid from the standpipe into the conduit 5. Pipe 14 is provided with a branch 19 controlled by valve 20 for the return of recovered solid from the off gases from chamber 1 to the standpipe. Line 14 is also provided with a control element 21 for permitting the withdrawal of solid from the system.

Just ahead of its junction with standpipe 4 conduit 5 is connected with a feed line 22 for hydrocarbon which, for illustrative purposes, may be considered methane. This feed line passes through the heat exchanger 23 where it picks up heat from the combustion gas in line 15, the latter normally having sufficient heat after passing through heat exchanger 16 to raise the temperature of the feed hydrocarbon to 500° F. or higher. The hydrocarbon and the metal oxide pass concurrently through conduit 5 which, of course, will be suitably lagged as will all other conduits to prevent loss of heat. This conduit is made sufficiently long so that at the velocity of flow employed there will have been formed ample quantities of carbon oxides and water by the time the mixture reaches the free metal or reforming catalyst in the reforming chamber 3.

By suitably adjusting the feed rates of solids and hydrocarbon to conduit 5 with relation to its length and with relation to the volume of zone 2, it is possible, by reason of the concurrent flow of these materials, to secure adequate production of $CO_2$ and water vapor for prevention of carbon deposition. The excess $CO_2$ and water vapor are subsequently reformed in zone 3.

Under the temperature and pressure conditions existing in conduit 5 and zone 2 the iron oxide, as for instance FeO, reacts with the hydrocarbons, as, for example, methane, to produce CO, $CO_2$, hydrogen, water and free metal. The free metal in turn functions as a cracking catalyst with respect to the unreacted hydrocarbons, which may result in an intermediate production of free carbon.

However, under the conditions of our process this free nascent fine carbon reacts with $CO_2$ and water, resulting in insignificant net production of free carbon. Thus, the solids remain substantially free of deposited carbon.

By operating in accordance with our process the production of non-nascent carbon, which will not react or which will react with difficulty under the conditions of the process, is avoided. It is well recognized that it is practically not possible to secure absolutely thorough and immediate mixing of a body of solids and a gas stream.

Thus, if the body of solids from zone 1 were mixed with the full feed stream of hydrocarbons, carbonization would occur as discussed heretofore. However, due to the difficulty of securing absolutely thorough mixing, localization of the carbonization reaction would occur in instances in zones containing inadequate $CO_2$ and water. With inadequate $CO_2$ and steam, the carbon would build up on the solids and assume a condition where it would not react or would react only with difficulty under the conditions of operation.

By operating in accordance with our process, wherein part of the hydrocarbons are introduced through line 22 and the remainder preferably by means of lines 25 and 27, the ratio of iron oxide to hydrocarbons is relatively large and the presence of a necessary oxidizing zone assumed in zones 5 and 2.

The conduit 5 terminates in chamber 2 in a cup-shaped receptacle 24 in which there is some increase in density in the suspension. The suspension passes from the cup-shaped member into the larger chamber 2 in which there is a further increase in density and a decrease of velocity with a consequent dropping out of some solid material to the bottom of chamber 2. As the mixture passes upwardly through pipe 6, additional hydrocarbon is injected through feed line 25.

The pipe 6 terminates in chamber 3 in a funnel-shaped member 26 from which the suspension emerges in the form of a fountain forming a dense phase having a definite upper level above the funnel-shaped member. To aid in the maintenance of this dense phase, additional quantities of hydrocarbon are injected into the bottom of chamber 3 through inlets 27. Solid particles continually fall out of the dense phase into drawoff 7 at the bottom of chamber 3. The reformed gas leaves the top of chamber 3 through line 28 and passes with its entrained solid to a cyclone separator 29 from the top of which product gas is recovered through line 30. The separated solid is drawn off the bottom of separator 29 by pipe 31 which empties into the lower part of chamber 2 after receiving the solids carried by bottom drawoff 7.

It is important that the solid in chamber 3 be predominantly free metal or reforming catalyst. A very suitable solid material for use in the process is alumina or magnesia carrying nickel and iron, the nickel constituting from 5 to 20% by weight of the combination and the iron constituting from about 5 to 10%. The iron component serves as the oxygen carrier while the nickel and magnesia or alumina, as the case may be, serve as the primary reforming catalyst. In any case, however, and considering iron itself for illustrative purposes, a supply of free iron is maintained in a hopper 32 which feeds into a standpipe 33 which discharges through a suitable control element 34 into the dense phase in chamber 3. The composition of the solid in chamber 3 should be frequently analyzed, and when it shows any appreciable build up of iron oxide, or other metal oxide used as the oxygen carrier, solids should be withdrawn from the system through line 14 and continuously replaced by free metal from hopper 32 until the composition of the solids in chamber 3 is satisfactory. Alternatively, the rate of feed of solid from standpipe 4 into conduit 5 may be decreased and iron added to the system, when necessary, as iron oxide supplied to chamber 1.

As has previously been indicated, it is desirable to operate chambers 2 and 3 at an elevated pressure because the product gas is used in a process operated at elevated pressure. A suitable operating pressure lies in the range of 200 lbs. to about 600 lbs./sq. in. and this pressure is realized at least in part by providing a standpipe 4 of adequate height. Chamber 2 will ordinarily be maintained at a temperature between about 1600 and 2000° F. while chamber 3 will usually be maintained at a temperature between about 1500 and 1900° F.

In order to realize satisfactory heat transfer from the oxidation chamber to the reduction and reforming chambers, it is advantageous to use an inert heat carrier. When such a sand is employed, it will constitute between about 30 and 60% of the stream of circulating solid and will be present in the form of particles covering a wide range within the limits heretofore specified. Even when such an inert heat carrier is employed, it is advantageous to include in the stream of circulating solids a small percentage, up to about 5%, of powdered magnesia to assist in fluidization.

In order to impart greater flexibility to the process and to preclude packing in the bottom of chamber 2, it is advantageous to inject into the bottom of this chamber through inlets 35 steam or carbon dioxide or both. It will be understood that the product gas will be customarily analyzed and from this analysis the adjustment of the various feeds will be determined. The feed rate of hydrocarbon through line 22 will be dictated by the velocity required for smooth operation in chambers 2 and 3, and adjustments of the composition of the product gas will be made by varying the hydrocarbon and steam and/or carbon dioxide feeds in inlets 25, 27 and 35.

Referring to Fig. 2, elements corresponding to elements in Fig. 1 bear the same numerals. That portion of the system in which the metal is oxidized is the same as in Fig. 1, including the elevated oxidation chamber 1 with the upright standpipe 4. In this case the conduit 5 is provided with a jacket 36 to which the hot residue gas from oxidizing zone 1 is fed through line 15. This hot gas is introduced into the jacket near the end of conduit 5 and leaves the jacket near the beginning of conduit 5 through line 37 which passes through heat exchanger 16 to give up heat to the hydrocarbon feed in line 22. Line 5 is provided with a plurality of valved branch lines 38 through which may be introduced reactants, such as hydrocarbon, steam, and/or carbon dioxide. Which of these reactants are to be added and in what quantities is indicated by the composition of the product gas. If this gas contains excess $CO_2$, water and/or hydrocarbon should be added. If it contains substantial quantities of hydrocarbon, water and/or $CO_2$ should be added. To supplement the heat supplied by the residue gas from the oxidizing chamber flue gas or other hot combustion gas may be introduced into the jacket at various points through valved lines 39. If desired, the gas fed into these lines may be a combustible mixture and combustion may be carried out inside the jacket. In some cases it is desirable to utilize part of the tail gas from the synthesis operation in which the product gas of the present process is utilized as the combustion gas fed in through lines 39.

The conduit 5 is made sufficiently long to provide suitable reaction time, taking into account the rate of feed of solid and hydrocarbon through this conduit for the reaction between the hydrocarbon and the metal oxide and for the reforming reaction between hydrocarbon, carbon dioxide and water, or any two thereof, in the presence of the reduced metal oxide. For these purposes it will be desirable to maintain the temperature along the conduit in the range of about 1500° to 2000° F.

The conduit 5 discharges into a separator 40 provided with suitable baffles 41 to induce a number of reversals of direction of flow of the gas therethrough to thereby facilitate separation of the solid. The solid drops out of the bottom of this separator through a valve 42 into line 8 in which it is returned to the reactor 1. The product gas leaves the separator through line 43 and passes through heat exchanger 44 in which it gives up heat to incoming air in line 9. If required, one or more cyclone separators may be included in line 43 to complete separation of solid from gas and the solids so recovered are likewise introduced into line 8.

It will be understood that the specific procedure heretofore described can be altered substantially without departing from the scope of the present invention. While iron has been mentioned as the oxygen carrier for illustrative purposes, it will be clear that other metals capable of being oxidized by air and giving up their oxygen under the conditions obtaining in chamber 2 may be employed.

The nature and objects of the present invention having thus been set forth and a specific illustrative embodiment of the same given, what is claimed and desired to be secured by Letters Patent is:

1. A method for producing an industrial mixture of carbon monoxide and hydrogen under pressure which comprises establishing a column of a fluidized solid, including a metal oxide capable of reacting with a hydrocarbon at temperatures between about 1600° and 2000° F. the metal of which is capable of catalyzing the reaction between a hydrocarbon and steam and carbon dioxide at a temperature between about 1500° F. and 1900° F., of sufficient height to provide the required hydrostatic pressure, continuously feeding said solid into a flowing stream of hydrocarbon maintained under a suitably elevated pressure, causing said hydrocarbon and finely divided solid to flow concurrently while maintained at a temperature within the ranges above specified for a period sufficient to effect the conversion of said hydrocarbon first into a gas comprising substantial proportions of carbon dioxide and steam, simultaneously to convert at least a portion of said metal oxide into solid particles comprising said metal, and thereafter converting further amounts of hydrocarbon with said initially produced carbon dioxide and steam, under the catalytic influence of said metal-containing solid particles into a gas containing carbon monoxide and hydrogen and recovering said gas mixture under the pressure prevailing in the system.

2. A method according to claim 1 in which the finely divided solid, after separation therefrom of the product gas, is subjected to an oxidation treatment, during which its temperature is elevated, and then returned to said column.

3. A method according to claim 1 in which the finely divided solid includes, in addition to the metal oxide, an inert solid of high heat capacity.

4. A method for producing an industrial mixture of carbon monoxide and hydrogen under superatmospheric pressure which comprises establishing a relatively low pressure oxidation zone, subjecting a finely divided solid, including a metal oxide capable of reacting with a hydrocarbon at a temperature between 1600° and 2000° F. the metal of which is capable of catalyzing the reaction between a hydrocarbon and steam and carbon dioxide at a temperature between about 1500° and 1900° F., to oxidation with a stream of air in said low pressure zone whereby the temperature of said solid is brought to between about 1700° and 2300° F. and heat is stored in said solid, downwardly dropping said hot solid into an upright column, maintaining said solid in said column in a fluidized condition whereby it creates a hydrostatic pressure head, feeding hot solid from the bottom of said column at a substantially lower level than said low pressure oxidation zone into a stream of hydrocarbon under suitably elevated pressure, flowing the mixture of hot solid and hydrocarbon concurrently for a period of time at said elevated pressure sufficient to effect the conversion of said hydrocarbon into a gas containing carbon dioxide and water vapor in contact with reduced metal oxide, reacting the resultant mixture with additional hydrocarbon to form a product gas containing carbon monoxide and hydrogen, separating product gas from said solid and returning the latter upwardly to said oxidation zone.

5. A method according to claim 4 in which the finely divided solid includes, in addition to said metal oxide, an inert solid of high heat capacity.

6. A method according to claim 4 in which the metal oxide is deposited on a light carrier selected from the class consisting of stable compounds of magnesium and aluminum.

7. A method according to claim 4 in which improved yields of CO and $H_2$ are obtained by adding additional amounts of at least one constituent selected from the group of reactant gases consisting of hydrocarbon, water vapor and carbon dioxide, continuously analyzing the product gas from the reaction, determining from said analysis a deficiency of at least one of said reactant gases therein relative to said group of reactants, continuously adding said gas to said reactant mixture to supply said deficiency, and completing the interaction of said reactants in the presence of said reduced metal oxide to give a final product gas consisting essentially of carbon monoxide and hydrogen.

8. A method for producing an industrial mixture of carbon monoxide and hydrogen under superatmospheric pressure which comprises establishing a relatively low pressure oxidizing zone, maintaining in said zone a body of finely divided solid, including a metal oxide capable of reacting with a hydrocarbon at temperatures between 1600° and 2000° F. the metal of which is capable of catalyzing the reaction between a hydrocarbon and steam and carbon dioxide at a temperature between about 1500° and 1900° F., passing an oxidizing gas upwardly through said low pressure zone at a velocity such that a dense lower phase and a dilute upper phase having a definite interface therebetween are formed, withdrawing hot finely divided solid from said zone downwardly into an elongated upright column, maintaining the solid in said column in a fluidized condition whereby it provides a hydrostatic pressure head, continuously feeding hot finely divided solid from the bottom of said column into a stream of hydrocarbon, at a substantially lower level and at a substantially higher pressure than that in said low pressure oxidation zone, passing said stream and said solids so fed concurrently through an elongated conduit, discharging said mixture into an enlarged zone in which a partial separation of solid from said mixture occurs, passing the resulting mixture into a second enlarged zone wherein residual solid is maintained in a fluidized condition by passing a gas upwardly therethrough at a velocity such that a dense lower phase and a dilute upper phase having a definite interface therebetween are formed, recovering product gas from said latter zone and returning solid from said latter zone to said oxidizing zone.

9. A method according to claim 8 in which additional hydrocarbon is introduced into said last-mentioned enlarged zone.

WARREN K. LEWIS.
EDWIN R. GILLILAND.

References Cited in the file of this patent
UNITED STATES PATENTS

| Number | Name | Date |
| --- | --- | --- |
| 1,899,184 | De Simo | Feb. 28, 1933 |
| 1,957,743 | Wietzel et al. | May 8, 1934 |
| 1,961,424 | Maier | June 5, 1934 |
| 2,420,558 | Munday | May 13, 1947 |
| 2,425,754 | Murphree et al. | Aug. 19, 1947 |
| 2,448,290 | Atwell | Aug. 31, 1948 |